Patented Feb. 16, 1954

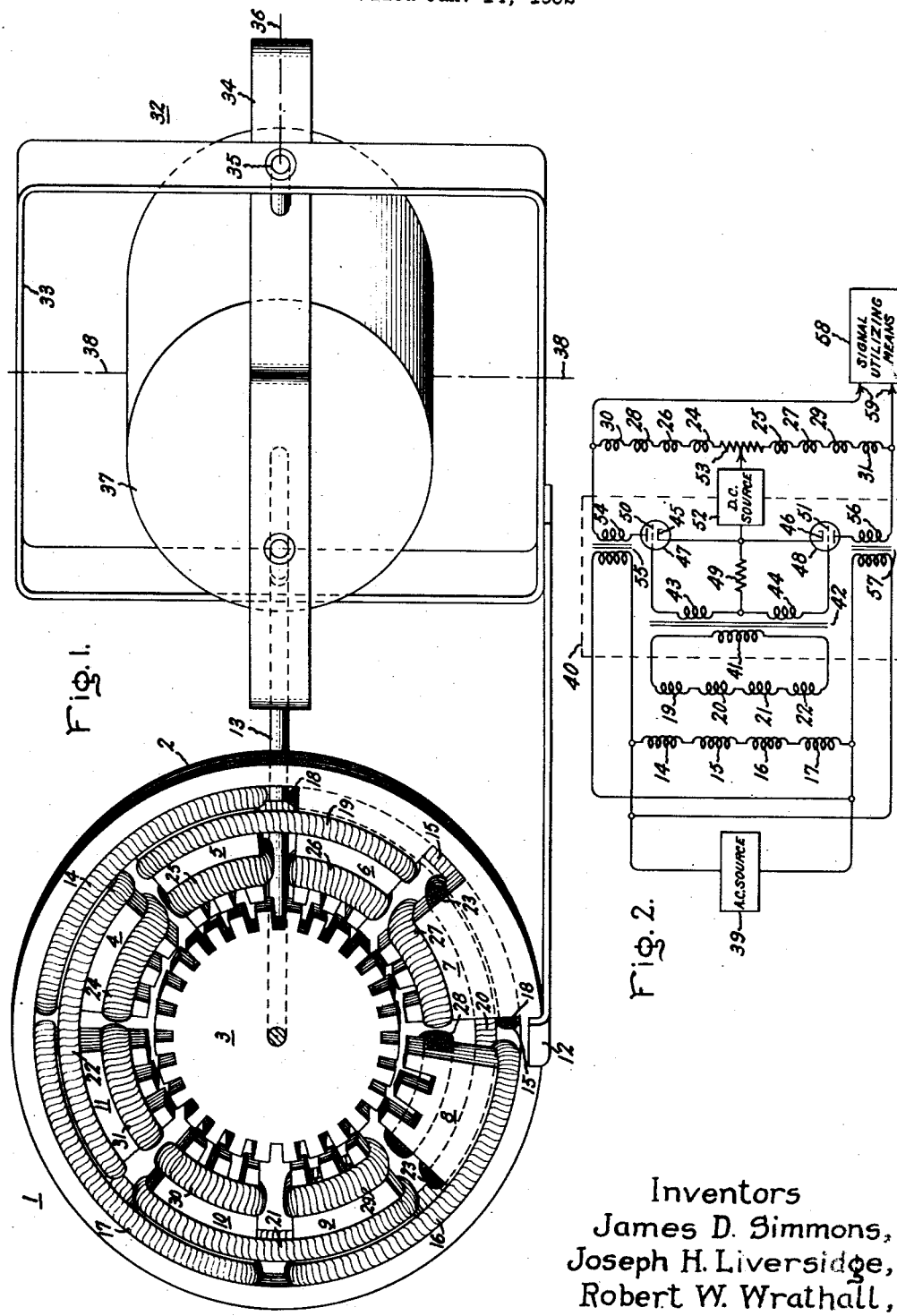

2,669,126

UNITED STATES PATENT OFFICE 2,669,126

ELECTRICAL CONTROL ARRANGEMENT

James D. Simmons and Joseph H. Liversidge, Sheffield, and Robert William Wrathall, Chertsey, England, assignors to General Electric Company, a corporation of New York Application January 14, 1952, Serial No. 266,302

11 Claims. (Cl. 74—5.6)

The present invention relates to electrical control arrangements, and, more particularly, to combination torque motor and pick-off devices.

In electro-mechanical systems it is frequently necessary that the physical relationships between two relatively movable members be translated into electrical signals characterizing this relationship, and it is also a requisite of certain of such systems that these same, or other, relatively movable members have forces applied therebetween. It has long been appreciated by those acquainted with such electro-mechanical systems that electrical signals characterizing the relationship between relatively movable members may be obtained with so-called electrical "pick-offs," and that controlled forces may be conveniently applied between movable members by electrical torque motors. Heretofore, separate electrical pick-offs and torque motors of conventional design have been utilized to perform the described functions, although there are numerous applications wherein the performance of both functions by a single device would result in greater accuracy and economy of space by virtue of the physical unity of structure alone. Whereas in accordance with conventional designs of electrical pick-offs and torque motors, the similarities of electrical and mechanical characteristics may afford a device which at one time of operation may function as a pick-off and at another time as a torque motor, the subject invention provides a single device which may operate as both a pick-off and torque motor simultaneously, and which has improved operating characteristics as well as improved constructional features. As will appear more fully hereafter, the subject device also functions to measure a displacement between members and simultaneously oppose such displacement with forces which serve to accomplish a fine balance or the preservation of a predetermined relationship between the members.

Accordingly, it is one of the objects of the present invention to provide an electrical control device which may simultaneously measure the displacement between relatively movable members and apply controlled forces between these members.

A second object is to provide a single device which operates simultaneously as an electrical pick-off and an electrical torque motor.

Further it is an object of this invention to provide an electrical control arrangement wherein a single device simultaneously measures the displacement between relatively movable members and applies forces exactly counterbalancing these displacements.

Still further, it is an object to provide an electrical control device having improved electrical and constructional characteristics and particularly adapted for application as a single-unit simultaneously-operating pick-off and torque motor for gyroscopes.

These and other objects and features of this invention may be noted in greater detail in the following description wherein reference is made, by way of example, to the drawings in which:

Fig. 1 illustrates in a partially cut-away pictorial view, one embodiment of a combination pick-off and torque motor in association with a rate gyroscope represented pictorially; and Fig. 2 is one schematic electrical circuit diagram of a control arrangement according to this invention.

The single-unit control device herein disclosed employs as the electrical pick-off component thereof an alternating current electrical inductive system operating in accordance with certain electrical transformer principles, and, as the electrical torque motor component thereof, a unique direct current torque-producing system, the characteristics of both components being such that they are compatible for simultaneous operation substantially without interference, and the constructions of both being such that both employ portions of the two relatively movable sections of the one unit. Referring to Fig. 1, a device of this nature is depicted in a partially cutaway pictorial view and identified generally by numeral 1, and comprises a laminated substantially annular stator member, 2, and a laminated substantially circular rotor member 3. Rotor 3 is slotted on its periphery such that it possesses a plurality of equally-spaced and equal-width teeth which project radially outward, the total number of teeth integral with the rotor 3 of the unit of Fig. 1 being twenty-eight. The stator member 2 is constructed with eight distinct poles of equal width, numbered 4 through 11 in the figure, which are integral with the remainder of the stator member and which project radially inward in the manner illustrated. Each of the poles 4 through 11 has two slots, on the innermost end thereof, which divide this pole end into three equally-spaced teeth of equal width. The pitches of the teeth on the stator pole and on the rotor are the same, but the width of the slots which separate adjacent stator poles is such that the pole pieces are displaced from angular correspondence with the rotor teeth by half a tooth pitch. The stator and rotor of device 1 are so constructed that their teeth terminate in circular paths which are of nearly the same diameter, thereby leaving only small radial gaps between the stator and rotor teeth, and the arrangement is further such that rotor teeth are in a position of medial alignment with the stator teeth of each pole when the rotor and stator members have the normal relative angular orientation illustrated. Stator member 2 is affixed to a stationary support 12, and rotor member 3 is annularly movable with its shaft 13 in relation to member 2 and support 12.

Four primary windings, numbered 14 through 17, are mounted on the stator member 2, each passing through slots between the stator poles and spanning a pair of stator poles, adjacent primary windings being wound in opposite directions, and all of the primary windings being serially coupled and connected with a source of alternating current. Thus, in Fig. 1, primary winding 14 spans poles 4 and 5; oppositely wound primary winding 15 spans poles 6 and 7; winding 16 spans poles 8 and 9; and winding 17 spans poles 10 and 11. The portion of primary winding 15 which overlies the front side of stator poles 6 and 7 in Fig. 1 has been cut away to show cross-sections 18 and the nature of this winding and the other primary windings. Four secondary windings or pick-offs, numbered 19 through 22, are also carried by stator member 2, each of these windings spanning a pair of stator poles, and the secondary windings pass through slots between stator poles which are intercalated with the slots through which the primary windings pass. Thus, secondary winding 19 spans poles 5 and 6; winding 20 spans poles 7 and 8; winding 21 spans poles 9 and 10; and winding 22 spans poles 11 and 4. Winding 20 has been shown cutaway, such that the individual turns thereof appear in cross-section at portions 23.

There are further provided on stator member 2, eight torque-producing windings, numbered 24 through 31, each of which encompasses a single stator pole. For purposes discussed later herein, alternate ones of these windings are serially coupled such that there are, electrically, two electrical paths each including four of the torque-producing windings. Although the electrical interconnections between windings, and their electrical associations with other apparatus, have not been diagrammed in Fig. 1, for the purpose of minimizing complexity of the drawings, windings 24, 26, 28, and 30 are serially connected and the alternate windings 25, 27, 29, and 31 are likewise serially connected. Winding 28 is represented in a cut-away view to show the turns thereof.

In Fig. 1, the electrical control device 1 is depicted as being actuated by a rate gyroscope 32. For purposes of the present description, this gyroscope is represented in an elementary form, comprising an outer gimbal structure 33, which supports an inner gimbal 34 in pivot 35 along a first axis 36, and a gyro rotor 37 which is caused to spin about a second axis perpendicular to the first axis by suitable motive means, not illustrated. Shaft 13 of the device 1 is angularly oriented by inner gimbal 34 and stationary support 12 is affixed to outer gimbal 33. Angular movement of the outer gimbal 33 about the central axis 38 results in a precessional force about the axis 36 of shaft 13, which force is proportional to the angular velocity of motion about axis 38.

Referring to Fig. 2, which is an electrical diagram for a control system such as that of Fig. 1, and wherein certain schematic elements bear the same numerals as those of corresponding pictorial elements of Fig. 1, it is shown that the serially connected primary windings 14 through 17 are energized by the alternating current source 39. When the rotor 3 and stator 2 have the null or normal orientations shown in Fig. 1, with rotor teeth in medial relationship to the stator pole teeth, the alternating flux produced by primary windings 14 through 17 passes equally through all the stator poles and rotor so that equal and opposite voltages are induced in each of the secondary windings 19 through 22 and there is no net output voltage produced across any one winding or the serial connection of these secondary windings. However, when rotor 3 is slightly displaced clockwise from the orientation illustrated, as occurs when operation of the gyroscope 32 creates appropriate angular movement of the shaft 13 with reference to gimbal 33, then the rotor teeth become more fully aligned with the teeth of stator poles 4, 6, 8, and 10, and are less aligned with the teeth of stator poles 5, 7, 9, and 11. A greater flux flow is thereby realized through the first-mentioned group of poles and less through the second-mentioned group, with the result that the alternating flux linking the secondary winding 22 due to primary winding 14 will be greater than that linking this secondary winding due to the primary winding 17. Consequently, the resultant voltage induced in secondary winding 22 has a phase determined by the phase of flux produced by primary winding 14 rather than by the phase of the flux produced by winding 17, and the magnitude of this resultant voltage is dependent upon the extent to which the rotor has been displaced from its null position. Similar effects are realized in each of the secondary windings 19, 20 and 21, and the net voltages of the series combination of all of the secondary windings characterize in phase and amplitude the direction and extent of the rotor displacement from the null position.

In addition to the electrical pick-off portions of device 1, the operation of which has just been described, there is a torque-producing portion, utilizing the windings 24 through 31, which may be energized electrically by any suitable means, but which may be energized responsive to the output from the pick-off portion of the same device to realize advantages in certain systems, such as the rate gyro system of Fig. 1, for example. The electrical diagram of one embodiment of this latter arrangement appears in Fig. 2, wherein the output from the series combination of the secondary windings 19 through 22 is applied to an amplifier, 40, and specifically, to the primary winding 41 of the amplifier input transformer 42. Secondary windings 43 and 44 of this transformer are connected in series and their junction is connected with cathodes 45 and 46 of electron discharge devices 47 and 48, respectively, through a cathode-grid circuit resistance 49. The outer ends of the input transformer secondary windings 43 and 44 are coupled with the grids 50 and 51 of discharge devices 47 and 48 respectively, and the voltages induced in these windings are thereby applied to control the currents flowing in the plate circuits of these tubes. Each of the plate-to-cathode circuits of the two tubes 47 and 48 includes the direct current source 52, one of the sets of torque-producing windings, and the secondary winding of an alternating current transformer. Thus, tube 47 has source 52, torque windings 24, 26, 28 and 30, a portion of the tapped resistance 53, and the secondary 54 of transformer 55 in circuit between its plate and cathode; and tube 48 has source 52, torque windings 25, 27, 29 and 31, the remaining portion of the tapped resistance 53, and the secondary winding 56 of transformer 57 in circuit between its plate and cathode. The primary windings 58 and 59 of transformers 55 and 57, respectively, are energized by the alternating current source 39 and cause alternating voltages to be induced in the secondaries 54 and 56 and to be applied to the plates of tubes 47 and 48 out of phase with respect to one another.

When an alternating output voltage of one phase is derived from the pick-off secondary windings 19—22, and produces signal voltages on the grid of tubes 47 and 48, one of these tubes will conduct more current than the other, due to the fact that its grid becomes more positive simultaneously with its plate voltage, while the grid of the other tube becomes more positive when its plate voltage is becoming more negative. The alternating plate voltages applied by transformer secondary windings 54 and 56 should not only be phased opposite to one another, but the phase of the grid voltage derived from the pick-off secondary windings 19—22 should be in phase with one alternating plate voltage and out of phase with the other when the pick-off rotor is displaced in one angular direction from null, and out of phase with the one alternating plate voltage and in phase with the other when the pick-off rotor is displaced in the other angular direction from the null position. Conventional phase-shifting means may be employed to insure that these desired phase relationships are obtained if they are not originally proper.

It will be recognized that the amplifier 40 functions as a discriminator type amplifier. That is, when the pick-off windings 19—22 produce an alternating output voltage of one phase such that grid 50 becomes positive while the plate of tube 47 is driven more positive by the alternating voltage across transformer winding 54, greater average unidirectional current will be conducted through torque-producing windings 24, 26, 28 and 30 than through windings 25, 27, 29 and 31, because the grid 51 of tube 48 simultaneously becomes more negative while the plate thereof is also driven more negative by the voltage across transformer secondary 56. The reverse relationship is realized when the phase of output voltage from pick-off windings 19—22 is reversed, that is, torque windings 25, 27, 29 and 31 then carry the greater average unidirectional current. The absolute values of the currents in the torque windings 24—31 are further dependent upon the amplitude of the pick-off secondary winding voltages, which vary with the extent of angular displacement of the pick-off rotor from its null position. It thus occurs that the group of four torque-producing windings which carry the larger unidirectional current is determined by the angular direction in which rotor 3 is moved, and the difference between the average value of the current in this group and the other group of torque-producing windings is determined by the magnitude of the rotor angular displacement.

Under a condition of greater unidirectional current flow through torque windings 24, 26, 28 and 30, than through windings 25, 27, 29 and 31, which results from a counterclockwise displacement of rotor 3 from the null position shown in Fig. 1, the greater unidirectional fluxes flowing through the teeth of stator poles 4, 6, 8 and 10 exert forces upon the rotor teeth which pull these rotor teeth in a clockwise direction toward a position of alignment between the pole and rotor teeth. The full alignment between these teeth is not realized, of course, because pick-off output signals cease when the rotor teeth are in medial alignment with the stator pole teeth. Corresponding reverse action occurs when rotor 3 is displaced in a clockwise direction from null. The amplifier arrangement of Fig. 2 functions as a discriminator in addition to providing amplification, but the plate circuit current in the two sets of torque winding, while unidirectional in each set of windings, may have sufficient periodic variations in amplitude to induce undesired voltages in the pick-off secondary windings 19—22. To preclude unwanted effects from such induced voltages, the alternate windings of each set of torque windings are wound in opposite direction, that is, windings 24 and 28 are wound in a direction opposite to that of windings 26 and 30, and windings 25 and 29 are wound in a direction opposite to that of windings 27 and 31; therefore, when one set of windings, for example, windings 24, 26, 28 and 30, carries the greater current, the direction of fluxes produced by these windings are such that the pick-off secondary windings 19—22 have exactly equal and opposite voltages induced therein and no resultant voltage due to the torque winding fluxes appears across the series combination of windings 19—22. The flow of steady unidirectional current through the torque windings may be insured by providing suitable electrical filtering means in circuit with the discriminator-amplifier arrangement.

From the foregoing, it will be appreciated that the primary and secondary windings on the stator and rotor of device 1 produce output or pick-off voltages which characterize the displacement of the rotor 3 and the gyro output shaft 13, while the torque windings produce torques on the rotor 3 in exact opposition to such displacements, and the resultant torque applied to rotor 3 and shaft 13 by device 1 just balances the torque applied to shaft 13 by the rate gyroscope 32. The torque developed by device 1 is dependent upon the difference between the magnetic forces produced by the two sets of torque windings, and since the torque produced by each of these two sets of windings is substantially proportional to the square of the current therein, the net torque is substantially proportional to the difference between the squares of these currents. The sum of the tube currents being substantially constant, with the current of one increasing as much as the other decreases for any grid input signal, the torque developed by device 1 bears a substantially linear relationship to the difference between the currents carried by the two sets of torque windings. The output voltages appearing across the series combination of these two sets of torque windings are also proportional to the differences in tube currents, the impedances of the two sets of torque windings being equal, and these voltages are representative of the torque applied to shaft 13 in a substantially linear relationship. In Fig. 2 this output voltage is represented as being applied to an appropriate signal-utilizing means, 58, such as an automatic piloting system in a craft, by way of coupling leads 59.

Although the simultaneously-operating torque motor and pick-off device of this invention has been described, by way of illustration, in application to a rate gyroscope system and in association with one electrical amplifier, it will be perceived by those acquainted with this art that the invention is susceptible of modification and adaptation in numerous ways without departure therefrom. Particularly, it should be noted that the pick-off portion of one control device need not necessarily actuate the torque motor portion of the selfsame device, but may, for example, actuate the torque motor portion of a similarly constructed device. Discriminator-amplifiers and filters of any suitable design may, of course, be employed in place of the amplifier arrangement depicted in Fig. 2, and, instead of the amplifier tubes being biased for conduction with zero input voltage, both tubes may be made non-conducting in the absence of input voltages so that one or the other will conduct according to the sense of the input voltages. Magnetic circuits of the stator and rotor of the control device are designed to remain magnetically unsaturated over the required working range to prevent interference between the action of the torque windings and the alternating flux which induces output voltages in the pick-off secondary windings. Further, it may be convenient in certain instances for the control device to have numbers of poles and numbers of pole and rotor teeth other than as illustrated and described hereinbefore; and the stator and rotor need not be of circular configuration, but may be essentially linear or only of relatively small angular width. The stator and rotor portions may also be reversed, such that the windings are all on the innermost member, or certain of the windings may be positioned on the rotor and others on the stator, with comparable satisfactory operation.

While particular embodiments of this invention have been shown and described, such matter is presented in an illustrative rather than a limiting sense, and it should be apparent from the foregoing that there are numerous changes and modifications which may be devised within the spirit and scope of the invention as set forth in the appended claims.

What we claim as new and desire to secure by Letters Patent of the United States is:

1. An electrical control arrangement comprising two relatively movable members of magnetic material, a source of periodically varying current, primary electrical winding means on one of said members coupled with said source, secondary electrical winding means positioned on one of said members to have voltages induced therein by said primary winding means and to produce electrical output signals characterizing displacements of said members from a predetermined relationship therebetween, a source of unidirectional currents, and electrical winding means on one of said members coupled with said unidirectional current source and producing forces tending to cause movement between said members simultaneously with the production of said output signals by said primary and secondary winding means.

2. An electrical control arrangement as set forth in claim 1 wherein said primary and secondary electrical winding means and said electrical winding means coupled with said source of unidirectional currents are positioned on the same one of said two relatively movable members.

3. An electrical control arrangement as set forth in claim 1 wherein both of said two relatively movable members of magnetic material are slotted to provide a plurality of tooth-like projections, said projections of one member being disposed substantially opposite the projections of the other member, and the projections on both members being spaced such that oppositely-disposed projections are in substantially medial alignment when said members have a predetermined relative position and such that certain ones of the projections of both members are in greater alignment than the other projections of both members when said members are moved from said predetermined relationship.

4. An electrical control arrangement as set forth in claim 1 wherein said unidirectional current source comprises means translating said electrical output signals into unidirectional currents characterizing said displacements of said members from a predetermined relationship.

5. An electrical control arrangement for a gyroscope comprising two relatively rotatable members of magnetic material, means positioning each of said members in accordance with the positions of one of two relatively rotatable parts of said gyroscope, a source of periodically-varying current, primary electrical winding means on one of said members coupled with said source, secondary electrical winding means positioned on said one of said members to have output voltages induced therein by said primary winding means characterized in phase and amplitude the displacements of said members from a predetermined relationship therebetween, a source of unidirectional currents, and electrical winding means positioned on one of said members and coupled with said unidirectional current source to produce torques between said members simultaneously with the induction of voltages in said secondary winding means.

6. An electrical control arrangement for a rate gyroscope comprising two relatively movable members of magnetic material each having projections along an edge thereof, said edges of said members being substantially oppositely disposed, means positioning each of said members in accordance with the positions of one of two relatively movable gimbals of said rate gyroscope, a source of periodically-varying current, primary electrical winding means on one of said members coupled with said source, secondary electrical winding means positioned on one of said members, the position of said secondary winding means relative to said primary winding means and the positions of said projections of said members being such that no output voltages are produced by said secondary winding means when said members have a predetermined relative position and such that output voltages produced by said secondary winding means characterize in phase and amplitude the direction and extent of displacements of said members from said predetermined position, electrical motive winding means positioned on one of said members to exert forces between said members when energized, and means translating said output voltages into unidirectional current signals and energizing said motive winding means to exert forces reducing said displacements between said members.

7. An electrical control arrangement as set forth in claim 6 wherein said electrical motive winding means comprises two current branches, a higher current flow in one branch determining one direction of force applied between said members by said motive winding means and a higher current in the other determining the application of forces between said members in the opposite direction, and wherein said translating means energizes one of said current branches more than the other when said output voltages have one phase and energizes the other current branch more when said voltages have the opposite phase.

8. An electrical control arrangement for a rate gyroscope as set forth in claim 6 wherein said translating means energizes said motive winding means to apply forces between said members just balancing the forces applied therebetween by said gyroscope, and further comprising means coupled with said translating means and utilizing signals therefrom which bear a predetermined relationship to the energizing of said motive means and the forces between said members.

9. An electrical control arrangement comprising two relatively movable members of magnetic material, each having projections on an edge thereof which is disposed opposite the other, said projections on both members being spaced such that oppositely-disposed projections are in medial alignment when said members have a predetermined relationship and such that certain ones of the projections of both members are in greater alignment than the other projections of both members when said members are moved from said predetermined relationship, means coupled with said members to apply forces therebetween, a source of periodically-varying current, primary electrical winding means on one of said members coupled with said source and producing flux flows in two directions simultaneously, secondary electrical winding means disposed on one of said members to have equal and opposite voltages induced therein by said flux flows when said members have said predetermined relationship and to produce output voltages of phase and amplitude characterizing the direction and extent of the movements of said members from said predetermined relationship, first electrical motive winding means on one of said members for producing unidirectional fluxes which tend to align certain ones of said projections of said members and thereby create relative movement of said members in one direction, second electrical motive winding means on one of said members for producing unidirectional fluxes which tend to align other ones of said projections of said members and thereby create relative movement of said members in the opposite direction, and means responsive to said secondary winding means output voltages creating flows of substantially unidirectional currents through said first and second electrical motive winding means which cause forces to be developed between said members equal and opposite to the forces developed by said force-applying means.

10. An electrical control arrangement as set forth in claim 9 wherein said means creating unidirectional current flows comprises a discriminator-amplifier actuated by said secondary winding means output voltages, and further comprising means utilizing the voltages developed across said first and second electrical motive winding means by the currents flowing therethrough.

11. An electrical control arrangement comprising a substantially annular stator member of magnetic material having a plurality of inwardly-disposed poles and a plurality of inwardly-disposed projections on said poles a substantially circular rotor member of magnetic material having a plurality of outwardly-disposed projections about the periphery thereof, said projections of said members being in medial alignment when said members have a predetermined angular relationship and the projections on one set of alternate poles being in greater alignment with said rotor projections when said members are displaced in one direction and the projections on the other set of alternate poles being in greater alignment with said rotor projections when said members are displaced in the other direction from said predetermined relationship, means creating torques between said members, a source of periodically-varying current, serially-coupled primary electrical windings on said stator member each spanning a pair of said poles and adjacent windings being oppositely wound, serially-coupled secondary electrical windings on said stator member each spanning a pair of said poles and intercalated with said primary windings, electrical torque windings each on one of said stator poles and alternate torque windings being serially coupled to form two electrical torque winding circuits, and means responsive to output voltages from said secondary windings causing greater current flow through one of said circuits when said secondary output voltages are of one phase and greater current flow through the other of said circuits when said secondary output voltages are of the opposite phase.

JAMES D. SIMMONS.
JOSEPH H. LIVERSIDGE.
ROBERT WILLIAM WRATHALL.

References Cited in the file of this patent

UNITED STATES PATENTS

| Number | Name | Date |
|---|---|---|
| 2,227,467 | Sweeney | Jan. 7, 1941 |
| 2,315,167 | Von Monteuffel et al. | Mar. 30, 1943 |
| 2,382,993 | Hoskins | Aug. 21, 1945 |
| 2,389,158 | Lane et al. | Mar. 20, 1945 |
| 2,429,612 | Curry | Oct. 28, 1947 |

FOREIGN PATENTS

| Number | Country | Date |
|---|---|---|
| 664,065 | Great Britain | Jan. 2, 1952 |